UNITED STATES PATENT OFFICE.

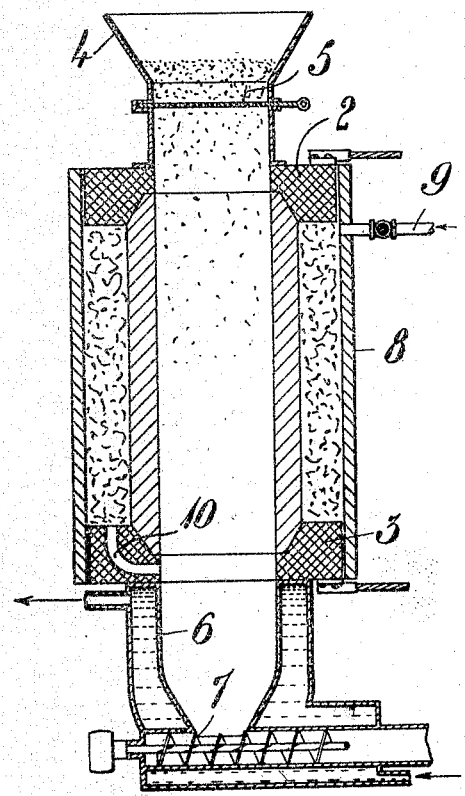

JOHAN HJALMAR LIDHOLM, OF LONDON, ENGLAND.

PROCESS OF PRODUCING CALCIUM CYANAMID.

1,184,109.     Specification of Letters Patent.     Patented May 23, 1916.

Application filed February 14, 1914. Serial No. 818,789.

*To all whom it may concern:*

Be it known that I, JOHAN HJALMAR LIDHOLM, a citizen of the Kingdom of Sweden, residing at London, Great Britain, have invented new and useful Improvements in Processes of Producing Calcium Cyanamid, of which the following is a specification.

This invention relates to an improved process of producing calcium cyanamid from calcium carbid and nitrogen.

The reaction between calcium carbid and nitrogen is performed according to the formula:

$$CaC_2 + N_2 = CaN_2 + C \quad (1).$$

Said reaction is, as is well known, exothermic and begins at a temperature of about 1,000 to 1100° C., if no special arrangements are made for lowering the reaction temperature. For performing the reaction, the calcium cyanamid must be in a finely divided porous state so that the nitrogen has access to every particle of the calcium carbid. A special difficulty in performing said reaction is caused by the fact that the calcium cyanamid is easily sintered, the sintering taking place at a temperature which lies only a few hundred degrees centigrade above the usual reaction temperature and causes an immediate interruption of the reaction in that the sintered mass prevents the access of the nitrogen to the carbid which has not been converted into calcium cyanamid. Such an elevation of the temperature to and above the sintering temperature readily takes place on account of the heat developed by the reaction, especially if the speed of the reaction is too great. Generally the reaction temperature is, therefore, lowered by an addition of catalytic substances, such as calcium chlorid or calcium fluorid, whereby the range between the starting temperature for the reaction and the sintering temperature is increased, and an elevating of the temperature to the sintering temperature is more easily avoided. Under such circumstances the reaction, however, requires a long time, for instance 30 hours for a charge of 500 kgs., and the yield will always rest considerably under its theoretical value. It has hitherto been thought that the losses were caused due to the cyanamid reaction being a reversible process having its reversing point at about 1360° C., and that accordingly, the most favorable condition in performing said reaction was to use a low temperature of reaction.

I have discovered, that the cyanamid reaction is not reversible, but that the losses are caused by the calcium cyanamid already formed, which latter is again partially dissociated according to the formula:

$$CaN_2 = Ca + N_2 + C \quad (2),$$

and further, that the speed of cyanamid reaction (formula 1) may be arbitrarily increased by increasing the temperature at which the reaction takes place. By elevating the temperature the dissociation according to formula (2) is likewise accelerated, but to a smaller extent than the reaction formula (1), and accordingly it is possible by using a sufficient high temperature of reaction to obtain a practically theoretical yield of calcium cyanamid. At a temperature of 1500° C., the speed of reaction is highly increased and increases further according to the rise in temperature, so that it is practically instantaneous and of an explosive nature at a temperature of 2000° C. Because the temperature used according to this invention exceeds the melting point of the calcium cyanamid, care is to be taken that said melting does not form any hindrance to the performing of the reaction. This is effected by spreading the carbid in the form of a powder into the nitrogen during the reaction, so that the reaction is performed in each separate particle of carbid, ere it comes into contact with other particles of carbid. The particles are, preferably, cooled after performing the reaction, while being still spread in the nitrogen whereby, after the particles have passed through the nitrogen and been acted upon by the reaction, their conglomeration is obviated. The necessary heating may be effected by heating the carbid and the nitrogen separately or both simultaneously. Thus for instance the nitrogen may be heated electrically to the necessary temperature, for instance 2000° C., and the powdered carbid may be caused to fall down through this gas, or the powdered carbid may be brought to fall through a furnace chamber containing nitrogen, the walls of which are heated electrically to such a high temperature that they heat, by radiating, the falling powder of carbid to a corresponding temperature, thereby causing it to react instantaneously with the nitrogen. The dissociation of the calcium cyanamid formed is then prevented by cooling the falling powder immediately after the performance of the reaction to a temperature below the temperature of dissociation.

A form of the process in question will be described below with reference to the accompanying drawing which shows a vertical section of a furnace for carrying the process into practice.

Referring to the drawing, the furnace consists of a tube 1 made of a suitable refractory and electrically conducting material as for instance carbon, and forming the chamber of reaction proper. To the said tube electric current may be supplied by the contact blocks 2, 3 attached to the ends of the tube and, preferably, provided with water- or air-cooling devices. At the top the tube is provided with a feeding hopper 4 which at the bottom has a sieve 5 through which the finely ground carbid introduced through the hopper may be sifted down through the tube 1. Below the chamber of reaction is located a cooling zone or cooling chamber 6, provided, preferably, with hollow walls of metal filled with water. At the bottom of the cooling chamber there is provided a feeding screw 7 or any other suitable device for removing the finished material from the furnace. The vertical, electrically conducting tube 1 is surrounded by a mantle 8 at the upper part of which is arranged an inlet 9 admitting the nitrogen. The block 3 is formed with a channel 10 admitting the nitrogen into the furnace. The nitrogen thus passes the space between the mantle 9 and the tube 1 and, consequently, enters the furnace strongly preheated. The said space is, preferably, filled up with pieces of charcoal in order to facilitate the preheating of the nitrogen and at the same time to consume the oxygen which possibly might accompany the nitrogen. Around the mantle 8 is placed a suitable heat non-conducting material, not shown in the drawing.

After the apparatus has been filled with nitrogen, an electric current is conducted through the tube 1 which thereby is heated to the temperature desired, for instance 2000° C. Then the feeding of carbid into the furnace commences. The finely divided powder of carbid falling down through the sieve is heated during its passage through the furnace by the heat radiating from the tube 1 and is rapidly brought to a temperature far exceeding the temperature of reaction. Owing to this, a sudden explosion-like combustion of the powder of carbid takes place in the nitrogen in about the same manner as when coal-powder is caused to fall down through strongly heated air. The heat developed during the reaction contributes in a high degree to the maintaining of the temperature of the furnace, and, on account thereof, the strength of the current flowing through the tube 1 may be reduced considerably when the process has started. The powder of cyanamid falling through the lower part of the furnace gives off a great part of its heat to the cooled wall of this part of the furnace so that it is comparatively cooled when reaching the bottom of the furnace. The material collected on the bottom of the furnace will be still more cooled, because of the bottom being water-cooled. Sintering or conglomerating of the material will thereby be obviated, and the feeding screw will deliver the calcium cyanamid in the form of powder or grains. The sudden cooling of the calcium cyanamid immediately after the forming thereof prevents losses of nitrogen on account of dissociation, and owing thereto one will, by sizing suitably the furnace and using a sufficiently high temperature, be able to obtain, from practical point of view, a theoretical output of calcium cyanamid.

It will be easily understood that the furnace described above is only one of the plurality of constructions which may be used in the practical performing of the process. Thus for instance, the material need not necessarily be heated by means of the heat generated in a resistance, since the tube 1 may be replaced by a tube or a chamber of reaction in which one or more horizontal or vertical electric arcs are struck and effect the heating. Said arcs may also, in well known manner be extended in the shape of disks. Instead of having the powder of carbid fall down by its own weight, it may be blown upward through the tube or the heating chamber or be spread horizontally by means of a centrifugal disk through a furnace of reaction heated to a high temperature.

Of course, the process may be performed by subjecting the nitrogen to overpressure as well as with or without additions of known kind to the carbid without deviating from the pricipal features of the invention.

Having now described my invention, what I claim as new and desire to secure by Letters Patent is:

1. The process of producing calcium cyanamid from calcium carbid and nitrogen, which comprises spreading finely divided calcium carbid into the nitrogen, and causing the carbid to react with the nitrogen at a temperature above the melting point of calcium cyanamid, while the carbid is suspended in the nitrogen.

2. The process of producing calcium cyanamid from calcium carbid and nitrogen, which comprises spreading finely divided calcium carbid into the nitrogen in a chamber of reaction, and heating the walls of said chamber to heat the calcium carbid to a temperature above the melting point of calcium cyanamid.

3. The process of producing calcium cyanamid from calcium carbid and nitrogen, which comprises spreading finely divided calcium carbid into the nitrogen in a chamber of reaction, heating the walls of said chamber to heat the calcium carbid and the nitrogen to a temperature above the melting point of calcium cyanamid, and cooling the calcium cyanamid formed, while being suspended in the nitrogen.

4. The process of producing calcium cyanamid from calcium carbid and nitrogen, which comprises spreading finely divided calcium carbid into the nitrogen in a chamber of reaction, the walls of which are electrically heated to such a temperature that they are capable of heating the calcium carbid and the nitrogen to a temperature above the melting point of calcium cyanamid, thus performing the reaction while the carbid is suspended in the nitrogen, and conducting the calcium cyanamid through a cooling zone.

In testimony that I claim the foregoing as my invention, I have signed my name in presence of two subscribing witnesses.

JOHAN HJALMAR LIDHOLM.

Witnesses:
  J. CALLESON HOLLEY,
  MURRAY A. CARSER.